United States Patent
Chinnakkonda Vidyapoornachary et al.

(10) Patent No.: US 9,471,236 B1
(45) Date of Patent: Oct. 18, 2016

(54) SECURITY FOR MEMORY MODULE DATA

(71) Applicant: International Business Machines Corporation, Armonk, NY (US)

(72) Inventors: Diyanesh B. Chinnakkonda Vidyapoornachary, Bangalore (IN); Ray C. Laning, Kasson, MN (US); Tony E. Sawan, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 27 days.

(21) Appl. No.: 14/666,952

(22) Filed: Mar. 24, 2015

(51) Int. Cl.
*G06F 21/00* (2013.01)
*G06F 3/06* (2006.01)

(52) U.S. Cl.
CPC ........... *G06F 3/0623* (2013.01); *G06F 3/0652* (2013.01); *G06F 3/0653* (2013.01); *G06F 3/0679* (2013.01)

(58) Field of Classification Search
USPC ....................................... 711/E12.091–E12.1
See application file for complete search history.

(56) References Cited

U.S. PATENT DOCUMENTS

| | | | |
|---|---|---|---|
| 5,026,296 A | 6/1991 | Hashiguchi | |
| 5,286,207 A | 2/1994 | McHugh | |
| 5,564,936 A | 10/1996 | David et al. | |
| 5,793,607 A | 8/1998 | Karidis et al. | |
| 6,047,343 A | 4/2000 | Olarig | |
| 6,357,663 B1 | 3/2002 | Takahashi et al. | |
| 7,152,095 B1 | 12/2006 | Motoyama et al. | |
| 7,255,577 B2 | 8/2007 | Graham et al. | |
| 7,877,563 B2 | 1/2011 | Breslau et al. | |
| 8,314,945 B2* | 11/2012 | Sasaki ................... | G06F 13/102 358/1.13 |
| 8,397,103 B2* | 3/2013 | Baba .................... | G06F 11/0745 714/24 |
| 8,568,151 B2 | 10/2013 | Cheng | |
| 8,868,628 B2* | 10/2014 | Kern ................. | G06F 17/30165 707/823 |
| 9,286,829 B2* | 3/2016 | Kim ....................... | G09G 3/3233 |
| 2003/0236998 A1 | 12/2003 | Gilstrap et al. | |
| 2009/0077293 A1 | 3/2009 | Kerrigan et al. | |
| 2011/0246707 A1 | 10/2011 | Ito | |

OTHER PUBLICATIONS

Daniel, May 9, 2011, Wipeyourdata.com, http://www.wipeyourdata.com/other-data-erasing/self-erasing-self-encrypting-toshiba-mkxx61gsyg-hard-drive/.*

IBM et al., "Connector Security," Original Disclosure Information: Research Disclosure n321 01-91, IP.com No. IPCOM000119415D, IP.com Electronic Publication: Apr. 1, 2005.

Anonymous, "Method for data security in electronic memory devices," IP.com No. 000227795, IP.com Electronic Publication: May 16, 2013.

* cited by examiner

*Primary Examiner* — Sean D Rossiter
(74) *Attorney, Agent, or Firm* — Heather S. Chatterton; Robert Williams

(57) ABSTRACT

A memory module contains a set of contacts configured to contact a second set of contacts on a memory module connector when the memory module is removed from the connector. The contacts on the connector can be activated. The memory module is configured to erase data on the memory module in response to the set of contacts on the memory module contacting the set of contacts on the connector when the set of contacts on the connector is activated.

16 Claims, 7 Drawing Sheets

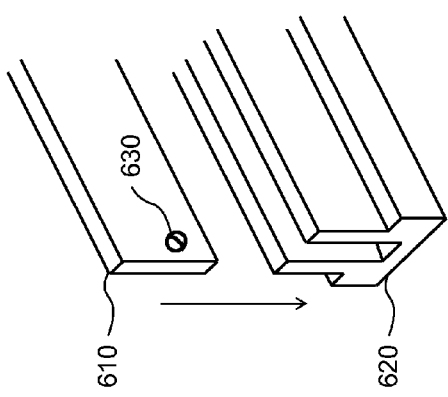
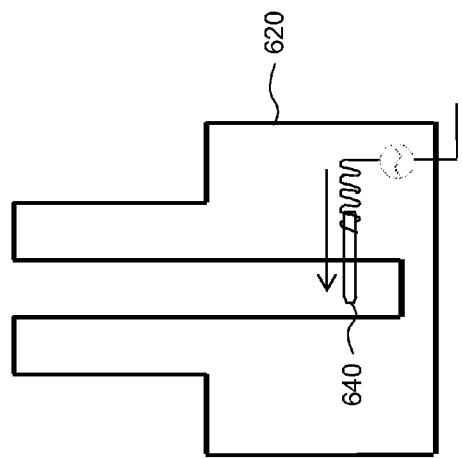
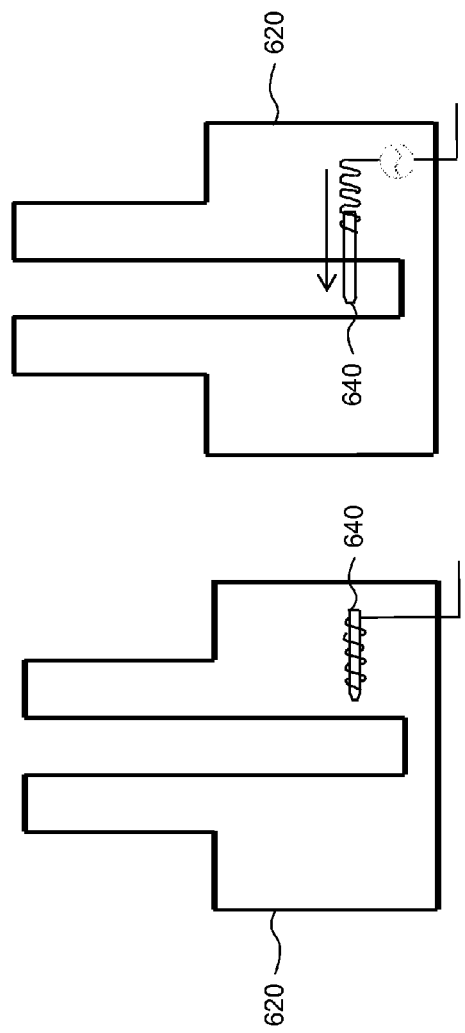

SECURITY FOR MEMORY MODULE DATA

BACKGROUND

The present disclosure relates to computer memory, and more specifically, to computer memory data security.

Growing memory usage presents numerous data security challenges. Non-volatile memory modules present a unique challenge as data is retained when power is lost. Thus, hackers may be able to remove a memory module and obtain access to the data if it is not secured properly.

SUMMARY

According to embodiments of the present disclosure, a method is disclosed. The method includes contacting, by one or more of a first set of contacts on a memory module, one or more of an activated second set of contacts on a memory module connector. The first set of contacts is configured to contact the second set of contacts as the memory module is removed from the connector. The method further includes erasing, by erase procedure circuitry on the memory module and in response to the contacting the one or more of the activated second set of contacts, data on one or more memory chips on the memory module.

Further disclosed herein are embodiments of a memory module. The memory module includes one or more memory chips. The memory module also includes a first set of contacts. The first set of contacts is configured to contact a second set of contacts on a memory module connector when the memory module is removed from the connector. The memory module further includes erase procedure circuitry. The erase procedure circuitry is configured to erase at least one of the one or more memory chips in response to the first set of one or more contacts contacting the second set of contacts when the second set of contacts are activated.

Further disclosed herein are embodiments of another method. The method includes receiving a request to provide authentication protection for a memory module. The memory module is connected to a computer system through a memory module connector. The method further includes activating, in response to receiving the request to provide authentication protection, a first set of contacts on the memory module connector. The first set of contacts is configured to contact a second set of contacts on a memory module when the memory module is removed from the connector. The first set of contacts is further configured to initiate an erase procedure on the memory module when the first set of contacts contact the second set of contacts when the first set of contacts is activated. The method further includes receiving a request to deactivate the authentication protection and prompting for authentication credentials.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 6A depicts an angled view of an example memory module and memory module connector for mechanically locking the memory module in place, according to embodiments of the present disclosure.

FIG. 6B depicts a side view of an example memory module connector with a mechanical lock which has not been activated.

FIG. 6C depicts a side view of an example memory module connector with a mechanical lock which is activated.

Figure 1:
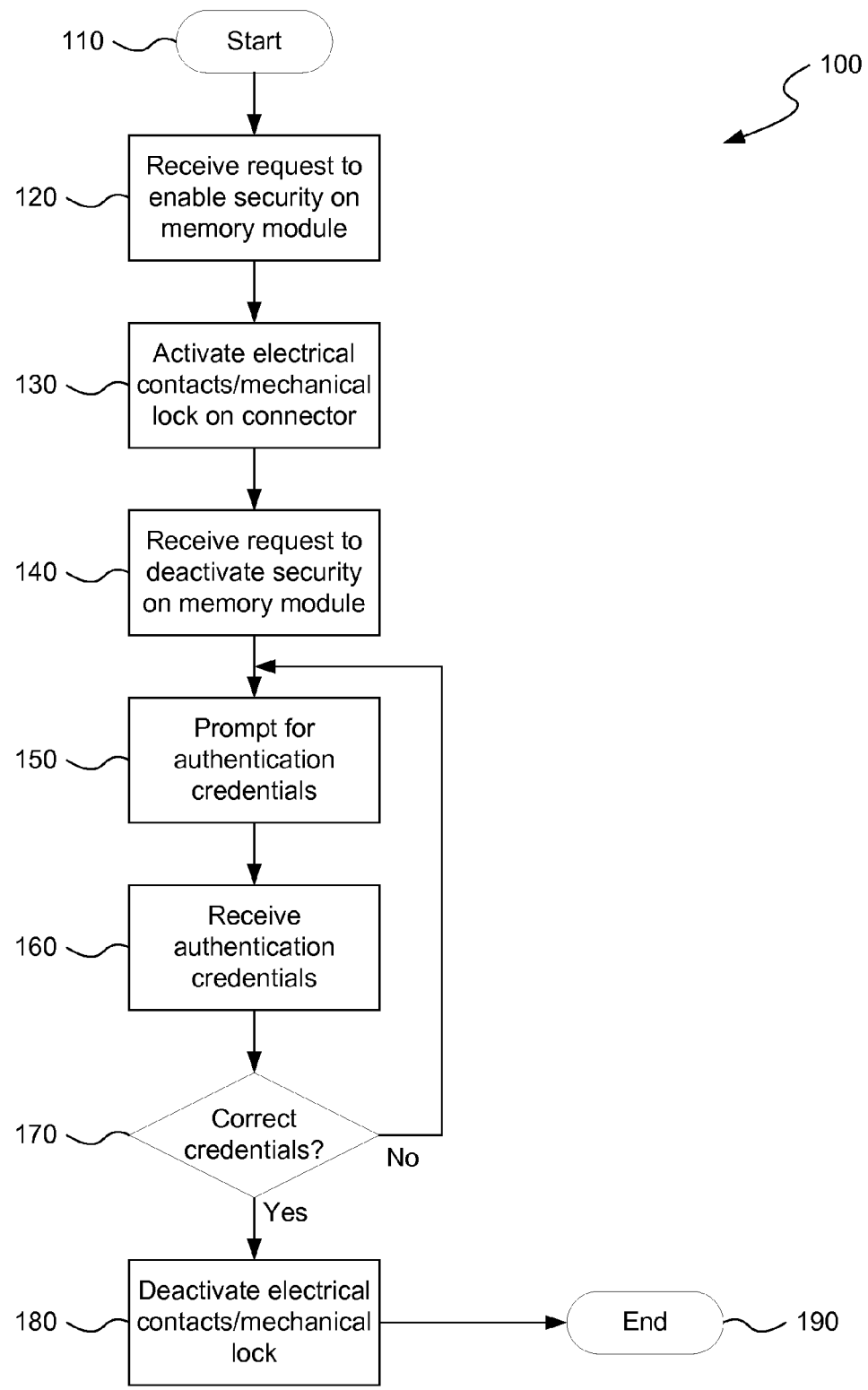
FIG. 1 depicts a flow diagram of an example method for providing security for a memory module.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to computer memory data security, and more particular aspects relate to electro-mechanical protection of computer memory modules. While the present disclosure is not necessarily limited to such applications, various aspects of the disclosure may be appreciated through a discussion of various examples using this context.

Embodiments of the present disclosure may provide for memory module data protection by erasing data on the memory module when an attempt is made to remove the memory module from the memory module connector that it is connected to. Aspects of the present disclosure may be particularly useful for non-volatile memory devices which would typically retain their data when removed from the power source provided through the connector. The connector contains one or more contacts, in addition to the normal communication contacts, which are placed such that they contact one or more contacts on the memory module as the memory module is removed from the connector. The contacts on the connector may be activated or deactivated by the system comprising the connector. The memory module may contain data erasing circuitry which is activated when contacts on the memory module contact activated contacts on the connector.

After the system activates the contacts on the connector, the deactivation of the contacts may be protected by authentication security. The contacts may remain active until the system receives the correct authentication credentials to deactivate the contacts. A user may interact with the system through a user interface to activate security on a given memory module to activate the contacts for a connector. Similarly a user may use a user interface to deactivate security on a memory module to deactivate contacts for the connector. The user may be able to select individual memory modules to protect by activating contacts on the corresponding connectors. In some embodiments, the user may also be required to enter authentication credentials to activate security on the memory modules.

In some embodiments, activating security on a memory module also includes activating a mechanical lock on the corresponding connector. The mechanical lock may include an electrically-actuated pin contained within the connector which extends out from the connector and into a slot in the memory module when activated. The pin may lock the memory module into place and prevent removal of the memory module without damaging the memory module. In some embodiments, the connector may contain more than one pin with the memory module containing corresponding slots. In some embodiments a user may be able to select among different levels of security to apply to a memory module and the different levels may correspond to different numbers of pins to activate on a given connector.

Referring to FIG. 1, a flow diagram of an example method 100 for providing security for a memory module is depicted. Method 100 begins at block 110. At block 120, a request to enable security on a memory module is received. In some embodiments, the request may be received from a user via a user interface. In some embodiments, the user may be required to enter authentication credentials to submit the request. At block 130, contacts are activated on the memory module connector that is connected to the memory module. In some embodiments, a mechanical lock on the connector is also activated that locks the memory module in place. At block 140, a request is received to deactivate the security on the memory module. At block 150, a prompt is made for authentication credentials. At block 160, authentication credentials are received. At block 170, it is determined whether the received authentication credentials are the correct credentials. If the credentials are incorrect, method 100 may return to block 150 and prompts for authentication credentials. If the credentials are correct, method 100 proceeds to block 180 and deactivates the contacts and, in some embodiments, the mechanical lock. At block 190, method 100 ends.

Figure 2:
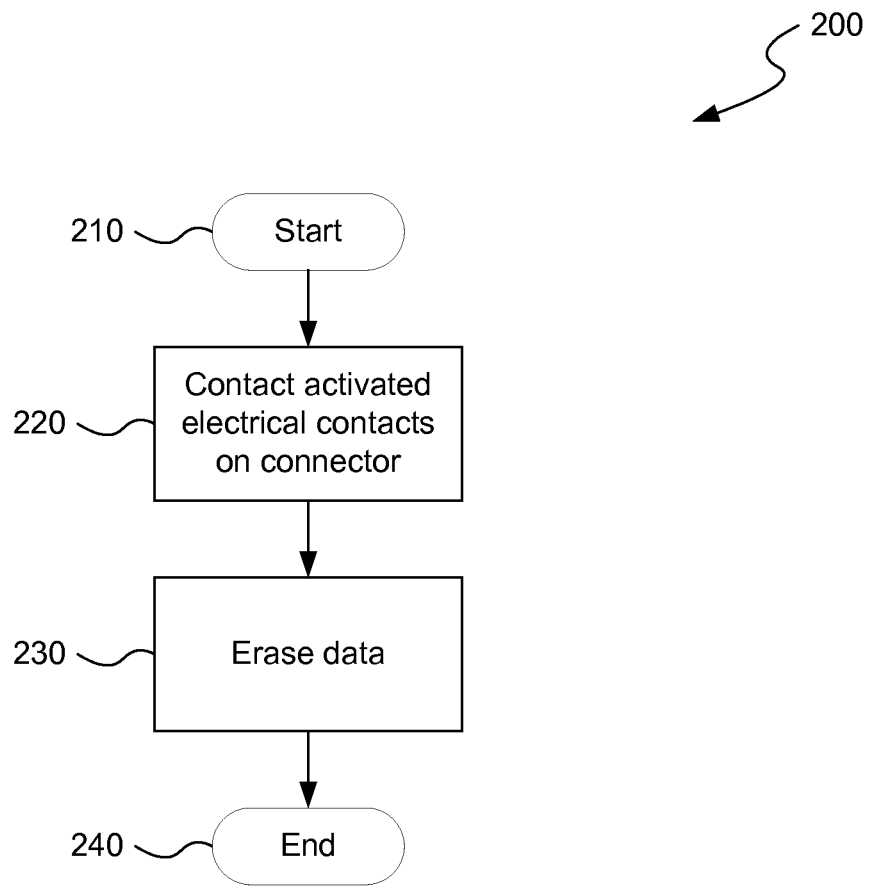
FIG. 2 depicts a flow diagram of an example method for erasing data on a memory module in response to unauthorized removal.

Referring to FIG. 2, a flow diagram of an example method 200 for erasing data on a memory module in response to unauthorized removal is depicted. Method 200 starts at block 210. At block 220, the contacts on the memory module contact activated contacts on the memory module connector. At block 230, the memory module erases data on one or more memory chips on the memory module. At block 240, method 200 ends.

Figure 3:
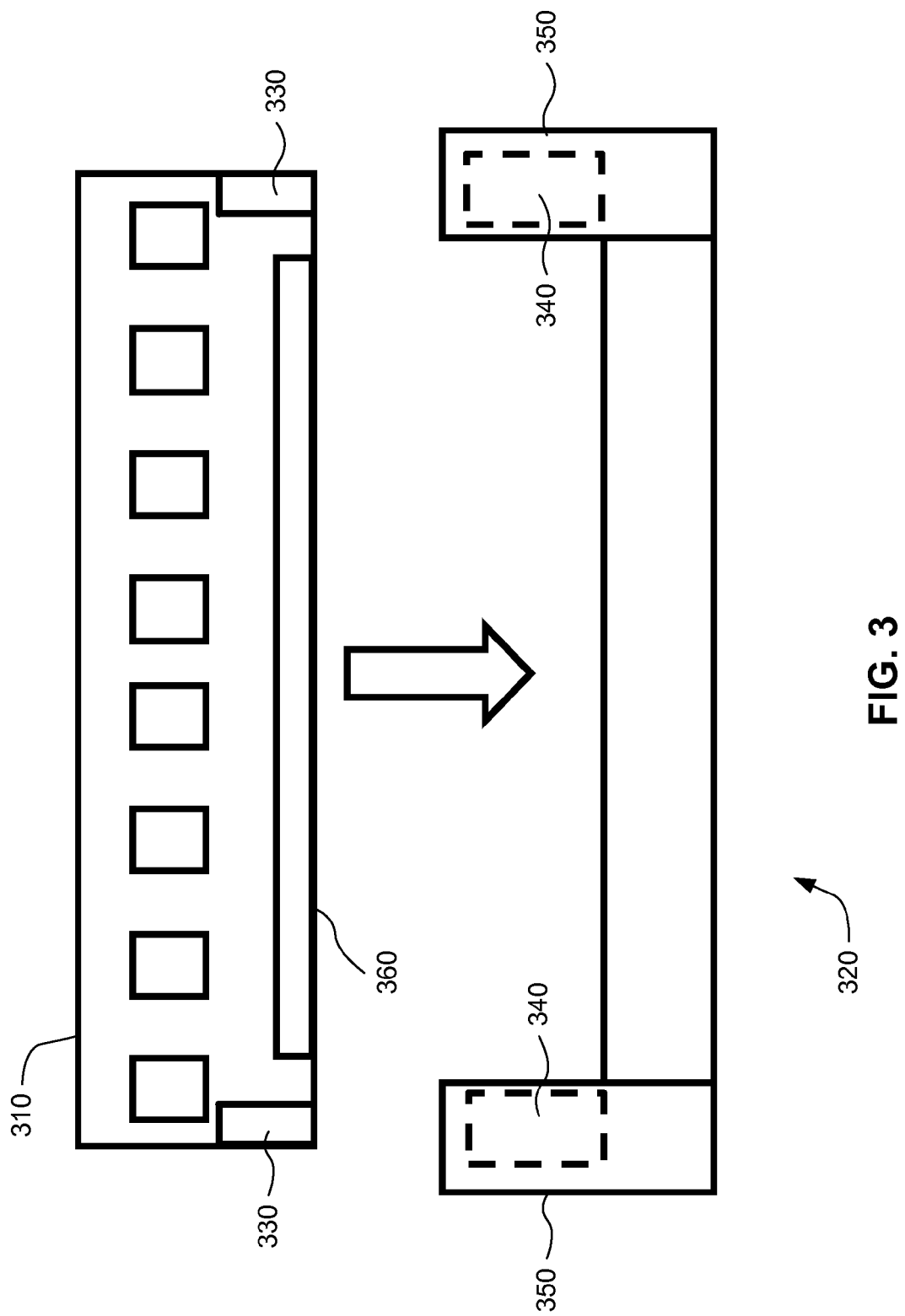
FIG. 3 depicts an example memory module and memory module connector according to embodiments of the present disclosure.

Referring to FIG. 3, an example memory module 310 and memory module connector 320 are depicted. Memory module 310 may be any type of memory module such as a dual in-line memory module (DIMM) with dynamic random access memory (DRAM) chips. Memory module 310 may be a non-volatile memory module. Memory module 310 is configured to slide into connector 320 through guides 350 as indicated by the arrow. Memory module 310 includes regular memory module contacts 360. Memory module 310 also includes additional contacts 330. Connector 320 includes contacts 340. Contacts 330 are located on memory module 310 such that they are not in contact with contacts 340 when memory module 310 is fully inserted into connector 320. However, contacts 330 are located on memory module 310 such that they contact contacts 340 as memory module 310 is being removed from connector 320. As depicted, contacts 330 may be placed on a face of module 310 that may contact an inner surface of guides 350 on connector 320. As depicted, the inner surface of guides 340 may contain contacts 340.

Contacts 340 may be activated by the system comprising connector 320 to provide security for data on memory module 310. Contacts 330 may be configured to activate an erase procedure on memory module 310 in response to contacting contacts 340 when contacts 340 are activated. In some embodiments, contacts 340 may provide power to data erasing circuitry on memory module 310 through contacts 330.

Figure 4:
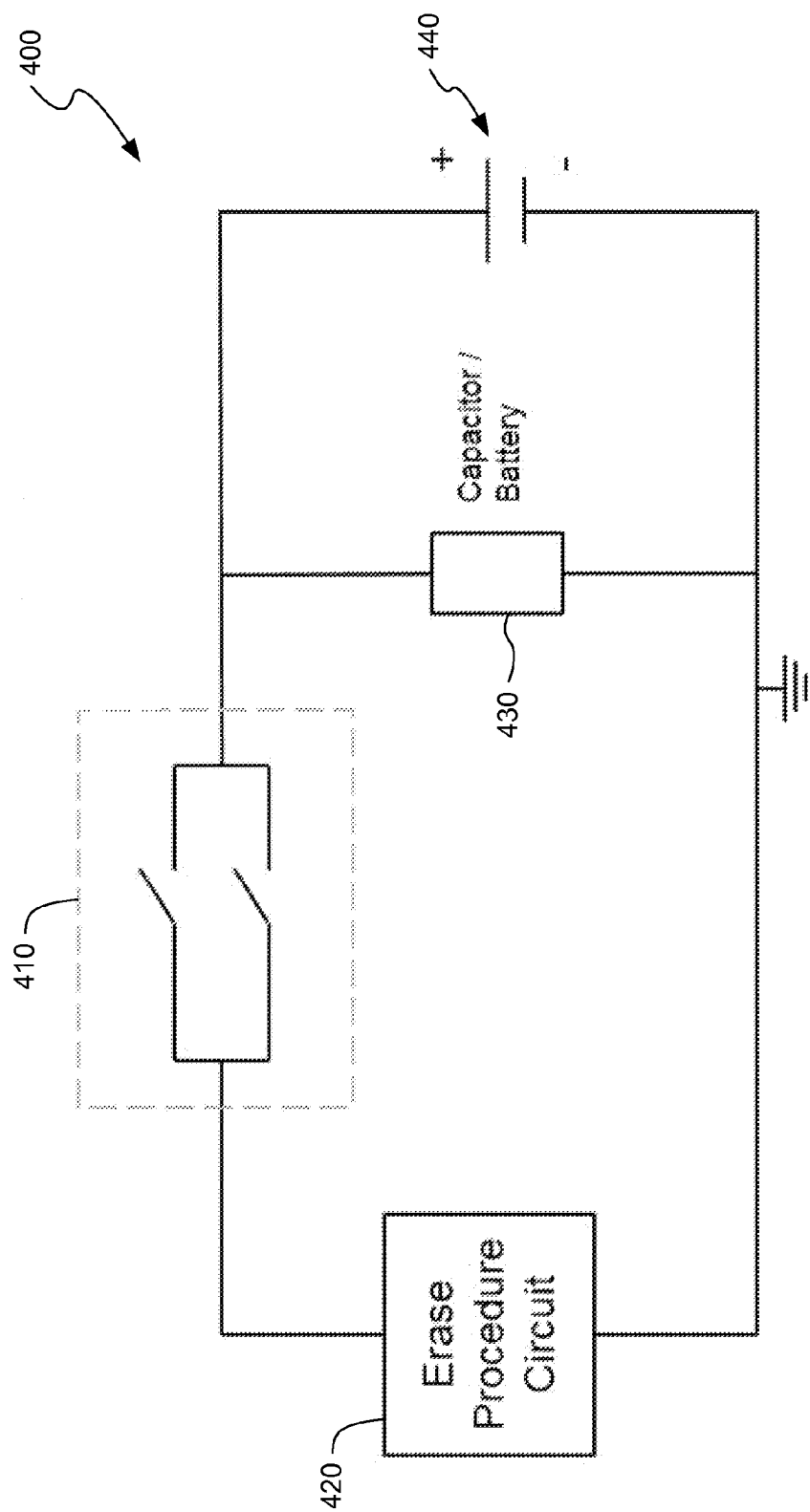
FIG. 4 depicts a circuit diagram of an example circuit for erasing data on a memory module in response to contacts on the memory module contacting activated contacts on a memory module connector.

Referring to FIG. 4, a circuit diagram of an example circuit 400 for erasing data on a memory module in response to contacts on the memory module contacting activated contacts on a memory module connector is depicted. Circuit 400 includes a pair of redundant switches 410 which are configured to remain open until the contacts on the memory module contact activated contacts on a memory module connector. Each switch of redundant switches 410 may correspond to a contact on the memory module. Thus, either contact on the memory module contacting an activated contact on the connector may result in a closed path. Circuit 400 includes erase procedure circuit 420 which is configured to erase data on the memory module when power is supplied to it. Data erasure power source 430 is configured to power erase procedure circuit 420 when redundant switches 410 create a closed path. The power source may be any source which is capable of storing a charge such as a battery or a capacitor. Power source 440 represents the power provided by the connector when the memory module is attached to the connector. Thus, when the memory module is attached to the connector, the power source charges data erasure power source 430. In some embodiments, redundant switches 410 may be replaced by switches in parallel such that both would need to be closed to create a closed path.

Figure 5:
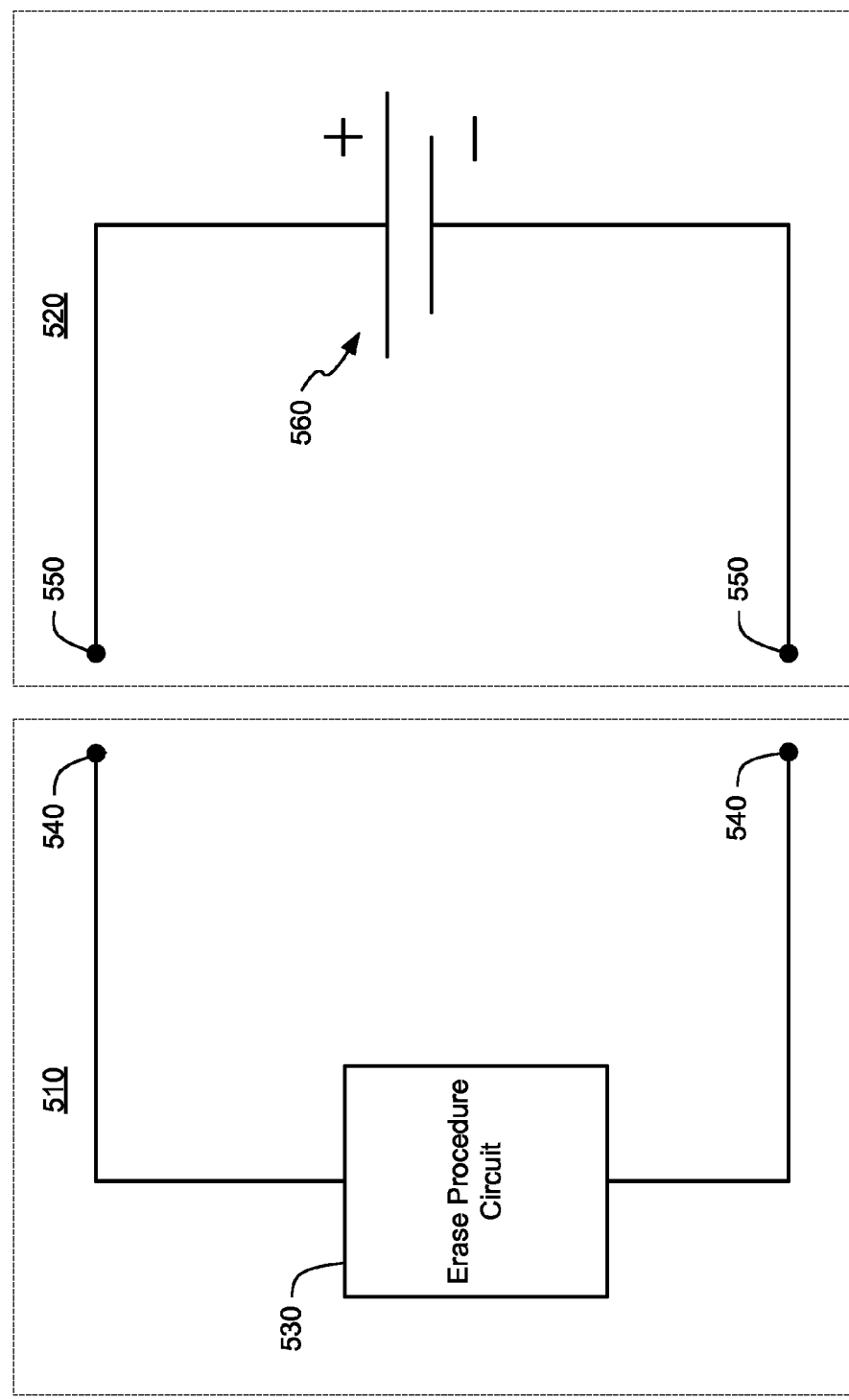
FIG. 5 depicts another circuit diagram of example circuitry for erasing data on a memory module in response to contacts on memory module contacting activated contacts on a memory module connector.

Referring to FIG. 5, a circuit diagram of example circuitry for erasing data on a memory module 510 in response to contacts 540 on memory module 510 contacting activated contacts 550 on memory module connector 520 is depicted. Circuit 500 includes erase procedure circuit 510 that is configured to erase data on the memory module when power is applied to it. Power source 560 is configured to power erase procedure circuit 530 when memory module contacts 540 contact connector contacts 550 to complete the circuit.

Referring to FIG. 6A-6C, different views of an example memory module 610 and memory module connector 620 configured for mechanically locking memory module 610 to connector 620 is depicted. Memory module 610 includes slot 630. Slot 630 is configured to accept pin 640 from connector 620, which locks memory module 610 in place, when memory module 610 is inserted into connector 620. Pin 640 may be an electrically-actuated spring-pin which is configured to enter slot 630 in response to being activated. FIG. 6B shows pin 640 in its deactivated position. FIG. 6C shows the pin in its activated position. Although only one pin and one slot are depicted, in some embodiments, the memory module may contain more slots and the connector may contain more pins. In some embodiments, there may be different levels of security which may be applied to the memory module and each level may correspond to a number of pins which are used to lock the memory module. For example, one pin may be used for a first security level, two pins may be used for a second security level, and three pins may be used for a third security level.

Figure 7:
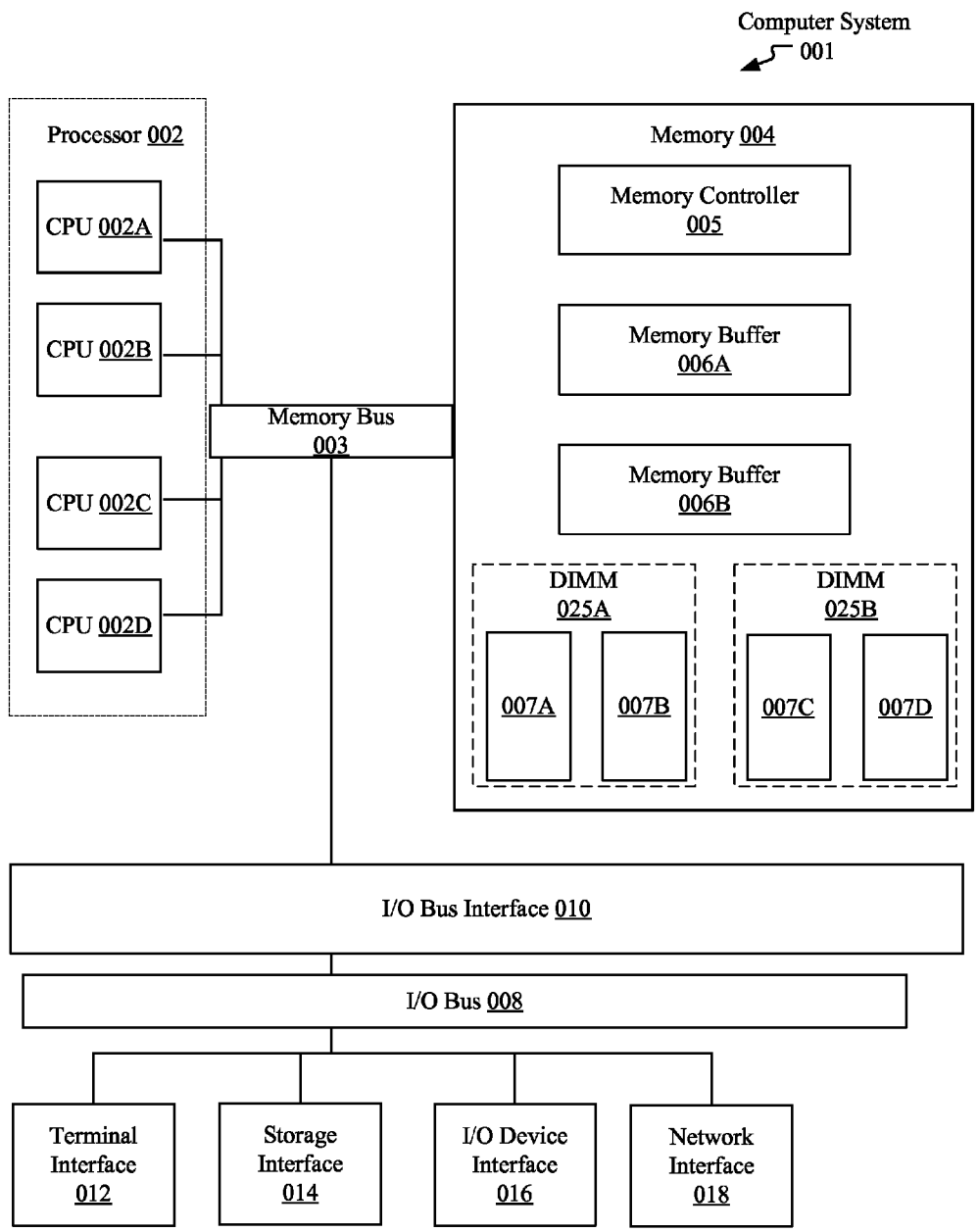
FIG. 7 depicts a high-level block diagram of an example computer system that may be used in implementing one or more of the methods, tools, and modules, and any related functions or operations, described herein, in accordance with embodiments of the present disclosure.

Referring now to FIG. 7, shown is a high-level block diagram of an example computer system (i.e., computer) 001 that may be used in implementing one or more of the methods, tools, and modules, and any related functions or operations, described herein (e.g., using one or more processor circuits or computer processors of the computer), in accordance with embodiments of the present disclosure. In some embodiments, the major components of the computer system 001 may comprise one or more CPUs 002, a memory subsystem 004, a terminal interface 012, a storage interface 014, an I/O (Input/Output) device interface 016, and a network interface 018, all of which may be communicatively coupled, directly or indirectly, for inter-component communication via a memory bus 003, an I/O bus 008, and an I/O bus interface unit 010.

The computer system 001 may contain one or more general-purpose programmable central processing units (CPUs) 002A, 002B, 002C, and 002D, herein generically referred to as the CPU 002. In some embodiments, the computer system 001 may contain multiple processors typical of a relatively large system; however, in other embodiments the computer system 001 may alternatively be a single CPU system. Each CPU 002 may execute instructions stored in the memory subsystem 004 and may comprise one or more levels of on-board cache.

In some embodiments, the memory subsystem 004 may comprise a random-access semiconductor memory, storage device, or storage medium (either volatile or non-volatile) for storing data and programs. In some embodiments, the memory subsystem 004 may represent the entire virtual memory of the computer system 001, and may also include the virtual memory of other computer systems coupled to the computer system 001 or connected via a network. The memory subsystem 004 may be conceptually a single monolithic entity, but, in some embodiments, the memory subsystem 004 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

In some embodiments, the main memory or memory subsystem 004 may contain elements for control and flow of memory used by the CPU 002. This may include all or a portion of the following: a memory controller 005, one or more memory buffers 006A and 006B and one or more memory devices 025A and 025B. In some embodiments, the memory devices 025A and 025B may be dual in-line memory modules (DIMMs), which are a series of dynamic random-access memory (DRAM) chips 007A-007D (collectively referred to as 007) mounted on a printed circuit board and designed for use in personal computers, workstations, and servers. The use of DRAMs 007 in the illustration is exemplary only and the memory array used may vary in type as previously mentioned.

Although the memory bus 003 is shown in FIG. 7 as a single bus structure providing a direct communication path among the CPUs 002, the memory subsystem 004, and the I/O bus interface 010, the memory bus 003 may, in some embodiments, comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 010 and the I/O bus 008 are shown as single respective units, the computer system 001 may, in some embodiments, contain multiple I/O bus interface units 010, multiple I/O buses 008, or both. Further, while multiple I/O interface units are shown, which separate the I/O bus 008 from various communications paths running to the various I/O devices, in other embodiments some or all of the I/O devices may be connected directly to one or more system I/O buses.

In some embodiments, the computer system 001 may be a multi-user mainframe computer system, a single-user system, or a server computer or similar device that has little or no direct user interface, but receives requests from other computer systems (clients). Further, in some embodiments, the computer system 001 may be implemented as a desktop computer, portable computer, laptop or notebook computer, tablet computer, pocket computer, telephone, smart phone, network switches or routers, or any other appropriate type of electronic device.

It is noted that FIG. 7 is intended to depict the representative major components of an exemplary computer system 001. In some embodiments, however, individual components may have greater or lesser complexity than as represented in FIG. 7, components other than or in addition to those shown in FIG. 7 may be present, and the number, type, and configuration of such components may vary.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The invention claimed is:

1. A method comprising:
   contacting, by one or more of a first set of contacts on a memory module, one or more of an activated second set of contacts on a memory module connector, the first set of contacts configured to contact the second set of contacts as the memory module is removed from the connector; and
   erasing, by erase procedure circuitry on the memory module and in response to the contacting the one or more of the activated second set of contacts, data on one or more memory chips on the memory module.

2. The method of claim 1, wherein the memory module is a DIMM.

3. The method of claim 1, wherein power for the erase procedure module is provided through the second set of contacts.

4. The method of claim 1, wherein power for the erase procedure circuitry is supplied by a power source on the memory module.

5. The method of claim 4, wherein the power source is applied to the erase procedure circuitry in response to the contacting the one or more of the activated second set of contacts.

6. The method of claim 1, wherein the memory module is a non-volatile memory module.

7. A memory module comprising:
   one or more memory chips;
   a first set of contacts, the first set contacts configured to contact a second set of contacts on a memory module connector when the memory module is removed from the connector; and erase procedure circuitry, the erase procedure circuitry configured to erase at least one of the one or more memory chips in response to the first set of contacts contacting the second set of contacts when the second set of contacts are activated.

8. The memory module of claim 7, further comprising:
a power source configured to supply power to the erase procedure circuitry.

9. The memory module of claim 8, wherein the power source is a battery.

10. The memory module of claim 8, wherein the power source is a capacitor.

11. The memory module of claim 7, wherein the erase procedure circuitry is further configured to receive power through the second set of contacts.

12. A method comprising:
receiving a request to provide authentication protection for a memory module, the memory module connected to a computer system through a memory module connector;
activating, in response to receiving the request to provide authentication protection, a first set of contacts on the memory module connector, the first set of contacts configured to contact a second set of contacts on a memory module when the memory module is removed from the connector, the first set of contacts further configured to initiate an erase procedure on the memory module when the first set of contacts contact the second set of contacts when the first set of contacts is activated;
receiving a request to deactivate the authentication protection; and
prompting for authentication credentials.

13. The method of claim 12, further comprising:
activating a mechanical lock on the connector in response to receiving the request to provide authentication protection, the mechanical lock configured to lock the memory module in place when activated.

14. The method of claim 13, wherein the mechanical lock comprises an electrically-actuated pin.

15. The method of claim 12, further comprising:
receiving the authentication credentials; and
deactivating the first set of contacts on the memory module connector.

16. The method of claim 12, further comprising:
contacting, by the first set of contacts, the second set of contacts; and
providing power to the memory module through the second set of contacts in response to the contacting the second set of contacts.

* * * * *